US010724429B2

(12) United States Patent
Jones et al.

(10) Patent No.: US 10,724,429 B2
(45) Date of Patent: Jul. 28, 2020

(54) AUXILIARY POWER UNIT WITH ELECTRICALLY DRIVEN COMPRESSOR

(71) Applicant: PRATT & WHITNEY CANADA CORP., Longueuil (CA)

(72) Inventors: Anthony Jones, San Diego, CA (US); Andre Julien, Ste-Julie (CA); David Menheere, Norval (CA); Jean Thomassin, Ste-Julie (CA); Richard Ullyott, St-Bruno (CA); Daniel Van Den Ende, Mississauga (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 27 days.

(21) Appl. No.: 16/227,141

(22) Filed: Dec. 20, 2018

(65) Prior Publication Data

US 2019/0128178 A1    May 2, 2019

Related U.S. Application Data

(62) Division of application No. 15/227,318, filed on Aug. 3, 2016, now Pat. No. 10,253,687.

(Continued)

(51) Int. Cl.
*F02B 53/14* (2006.01)
*B64D 41/00* (2006.01)
(Continued)

(52) U.S. Cl.
CPC .............. *F02B 53/14* (2013.01); *B64D 41/00* (2013.01); *F02B 53/04* (2013.01); *F02B 63/04* (2013.01); *Y02T 50/53* (2013.01)

(58) Field of Classification Search
CPC .......... F02B 53/14; F02B 53/04; F02B 63/04; B64D 41/00; Y02T 50/53
(Continued)

(56) References Cited

U.S. PATENT DOCUMENTS 7,174,714 B2    2/2007   Algrain
7,322,202 B2    1/2008   Zywiak et al.
(Continued)

FOREIGN PATENT DOCUMENTS

| CA | 2938119 | 2/2017 |
| FR | 2986780 | 8/2013 |
| GB | 2127492 | 4/1984 |

*Primary Examiner* — J. Todd Newton
(74) *Attorney, Agent, or Firm* — Norton Rose Fulbright Canada LLP

(57) ABSTRACT

An auxiliary power unit for an aircraft includes a rotary intermittent internal combustion engine, a turbine having an inlet in fluid communication with an outlet of the engine, the turbine compounded with the engine, a compressor having an inlet in fluid communication with an environment of the aircraft and an outlet in fluid communication with the aircraft, the compressor rotatable independently of the turbine, an electric motor drivingly engaged to the compressor, and a transfer generator drivingly engaged to the engine, the transfer generator and the electric motor being electrically connected to allow power transfer therebetween. The compressor or an additional compressor may be in fluid communication with the inlet of the engine. A method of operating an auxiliary power unit of an aircraft is also discussed.

16 Claims, 7 Drawing Sheets

Related U.S. Application Data

(60) Provisional application No. 62/202,283, filed on Aug. 7, 2015.

(51) Int. Cl.
   *F02B 53/04* (2006.01)
   *F02B 63/04* (2006.01)

(58) Field of Classification Search
   USPC .......................................................... 60/624
   See application file for complete search history.

(56) References Cited

U.S. PATENT DOCUMENTS

| | | |
|---|---|---|
| 7,383,684 B2 | 6/2008 | Vuk |
| 7,753,036 B2 | 7/2010 | Lents et al. |
| 7,775,044 B2 | 8/2010 | Julien et al. |
| 7,958,727 B2 | 6/2011 | Arnold |
| 8,480,460 B2 | 7/2013 | Schwarz |
| 8,522,550 B2 | 9/2013 | Lofgren |
| 8,740,746 B2 | 6/2014 | Figler et al. |
| 9,027,345 B2 | 5/2015 | Julien |
| 9,267,442 B2 | 2/2016 | Denholm et al. |
| 2008/0314573 A1 | 12/2008 | Schwarz et al. |
| 2009/0088063 A1* | 4/2009 | Schwarz ............... B64D 41/00 454/71 |
| 2010/0013242 A1* | 1/2010 | Schwarz ............... F01D 13/02 290/4 D |
| 2013/0214091 A1* | 8/2013 | Hillel ..................... F01N 5/04 244/58 |
| 2014/0195134 A1 | 7/2014 | Maier |
| 2015/0034771 A1* | 2/2015 | Joubert ................. B64D 41/00 244/53 B |
| 2016/0017793 A1 | 1/2016 | Johnson |
| 2016/0245163 A1* | 8/2016 | Lamarre ............... F01C 11/008 |
| 2016/0376021 A1* | 12/2016 | Ullyott ................. F01C 21/008 60/783 |
| 2016/0376022 A1* | 12/2016 | Ullyott ................. B64D 41/00 290/52 |
| 2016/0376023 A1* | 12/2016 | Ullyott ................. F01C 11/008 290/52 |
| 2016/0376981 A1* | 12/2016 | Ullyott ................. F01C 11/008 60/607 |
| 2017/0037775 A1* | 2/2017 | Jones .................... F02B 39/10 |
| 2017/0268409 A1* | 9/2017 | Thomassin ........... B64C 21/08 |
| 2017/0306786 A1* | 10/2017 | Bruno ................... B64D 13/06 |

\* cited by examiner

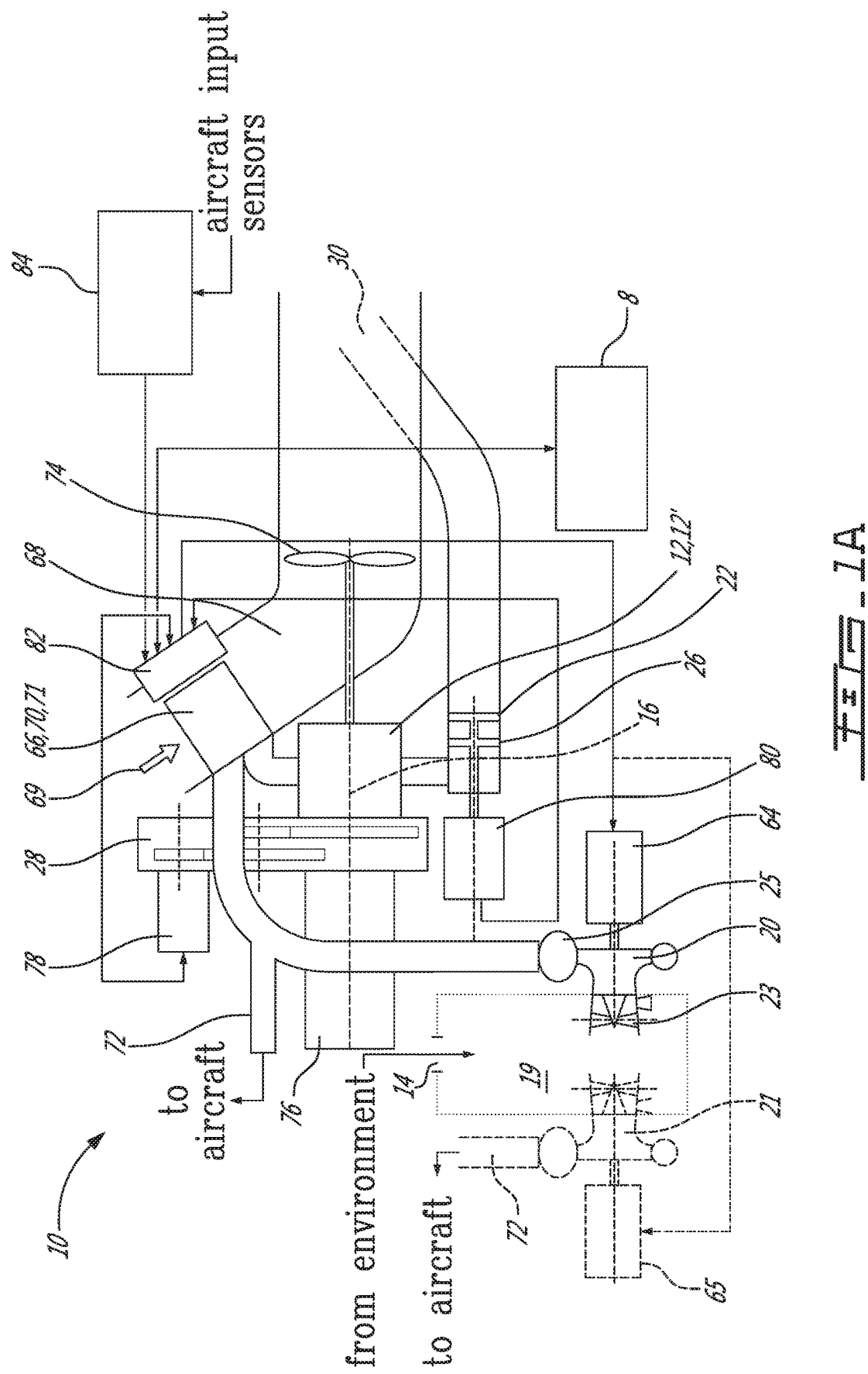

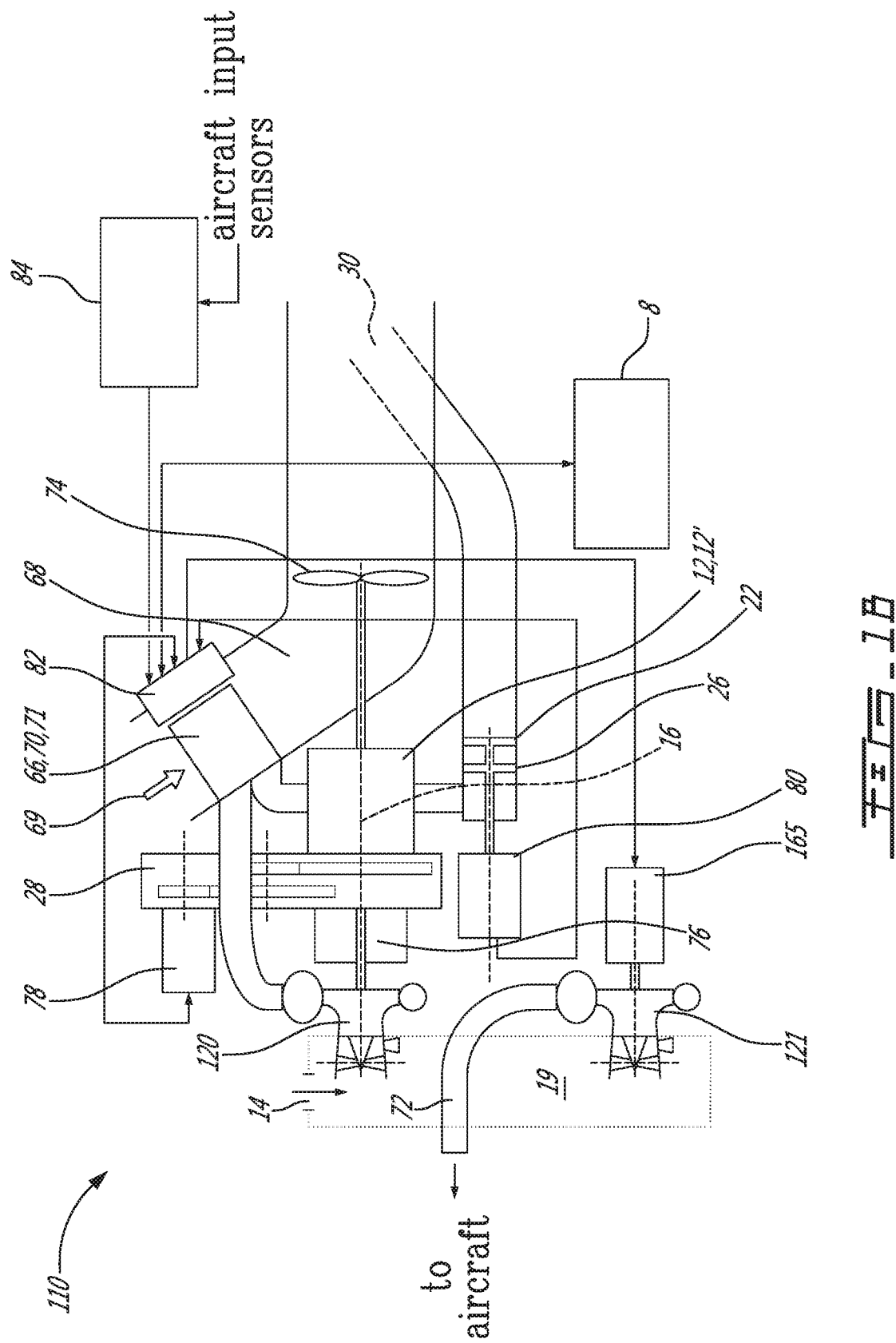

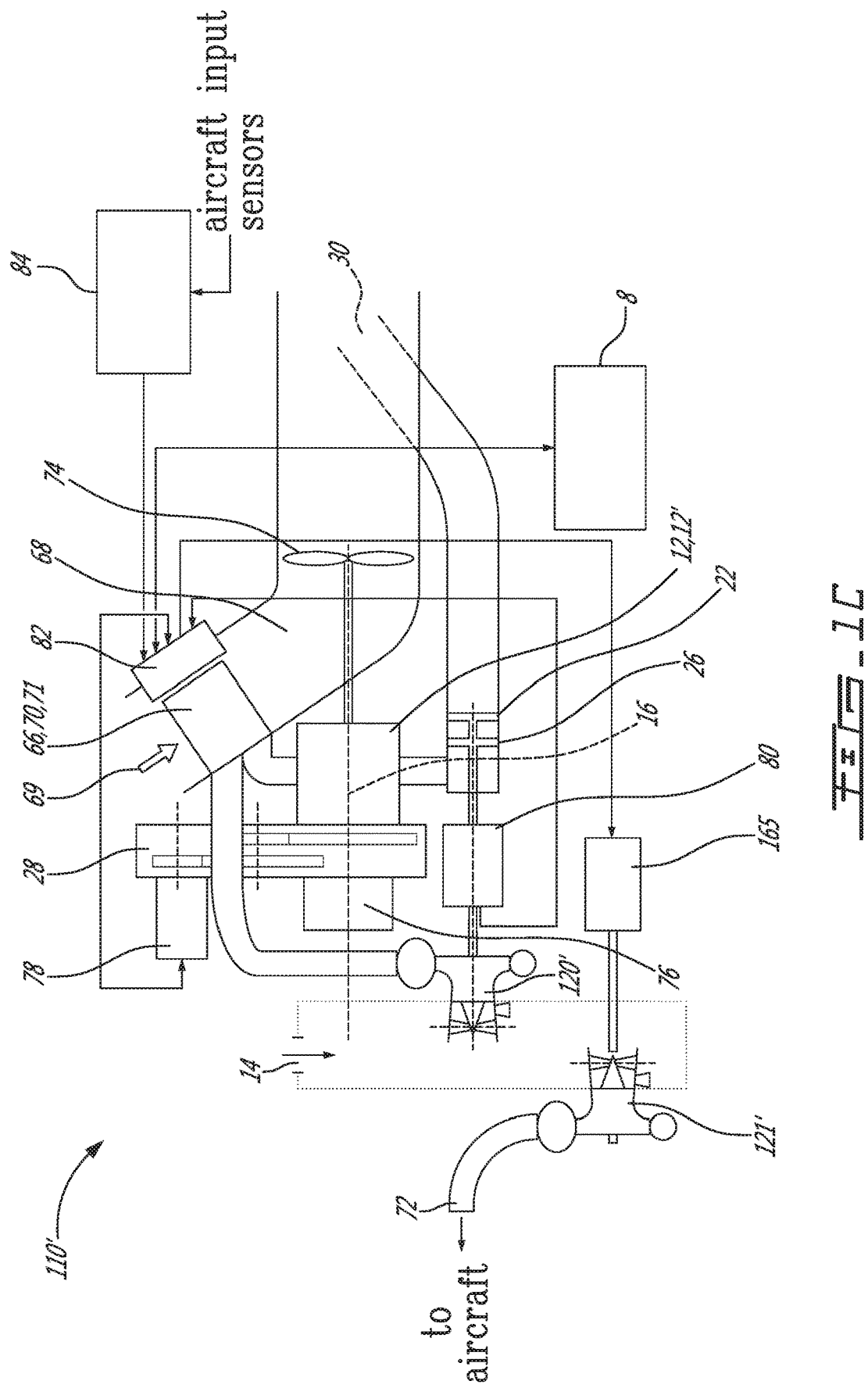

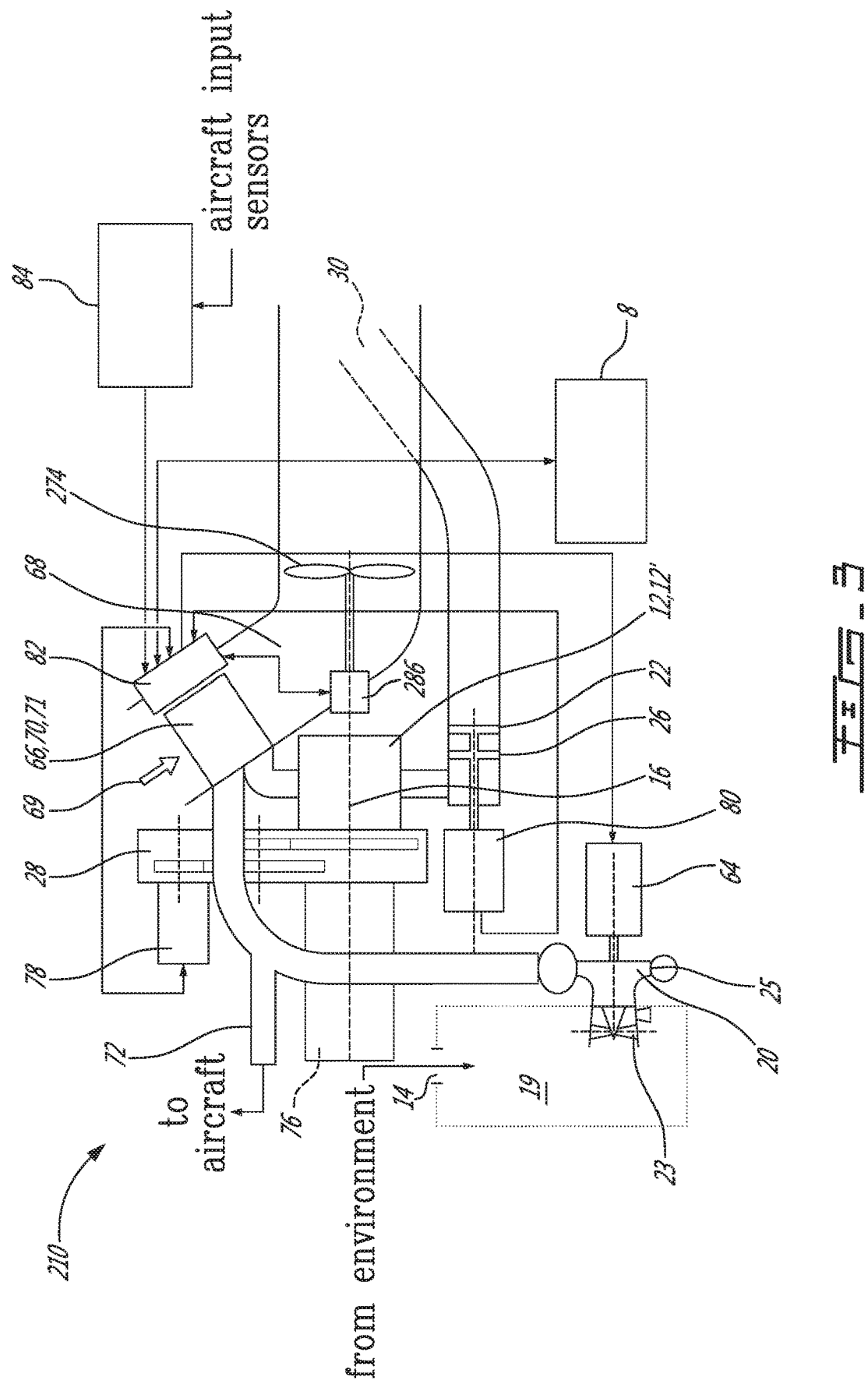

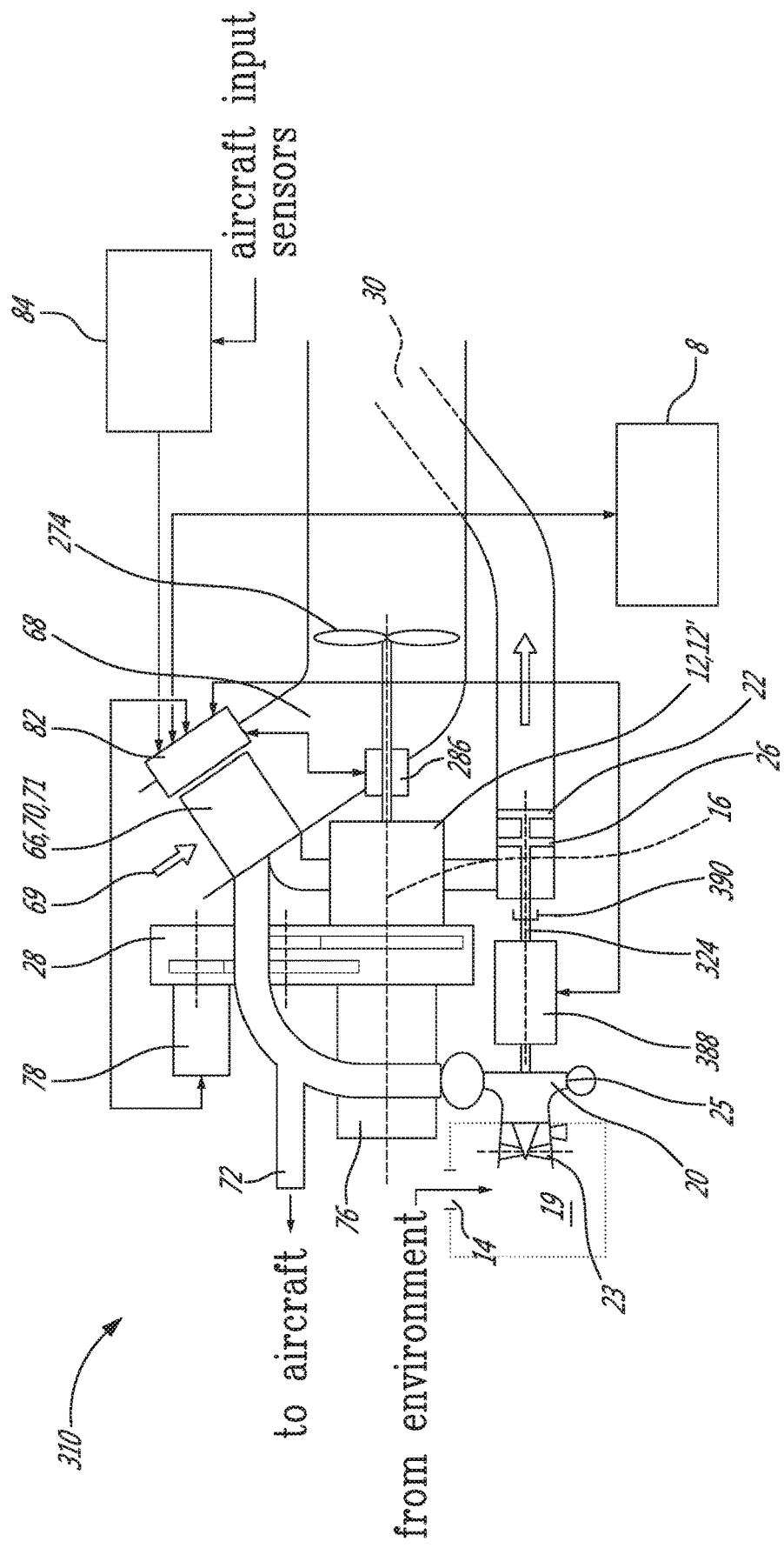

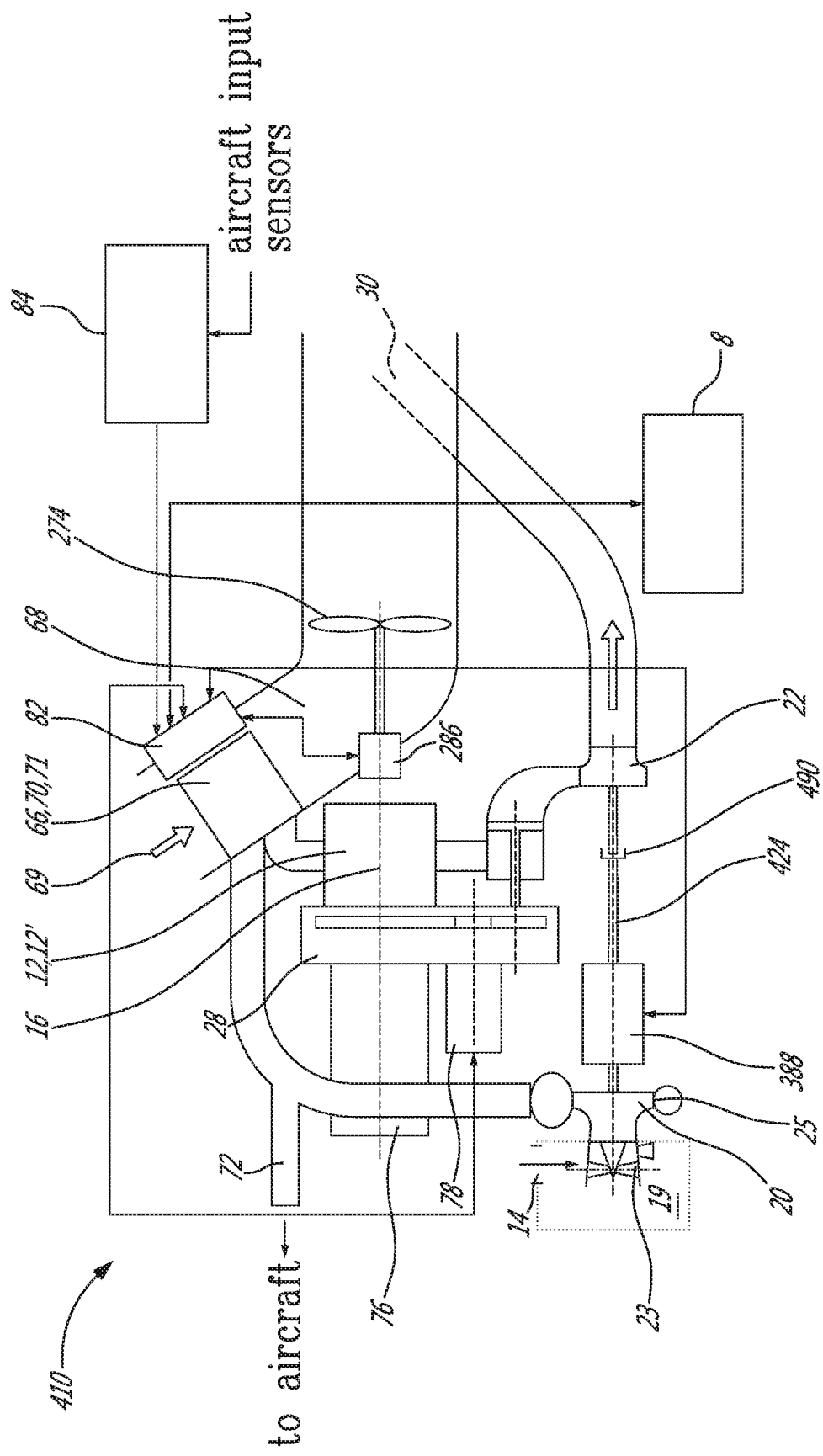

AUXILIARY POWER UNIT WITH ELECTRICALLY DRIVEN COMPRESSOR

CROSS-REFERENCE TO RELATED APPLICATIONS

This application is a divisional of U.S. application Ser. No. 15/227,318, filed Aug. 3, 2016, which claims priority from U.S. application No. 62/202,283 filed Aug. 7, 2015, the entire contents of which are incorporated by reference herein.

TECHNICAL FIELD

The application relates generally to compound engine assemblies and, more particularly, to such engine assemblies used as auxiliary power units in aircraft.

BACKGROUND OF THE ART

In auxiliary power units having a compressor and a turbine mechanically connected to one another and/or to an engine core, the compressor, turbine and engine core are typically sized to be able to accommodate peak loads. Accordingly, one or more components may not be operating efficiently during operation at average loads. Moreover, a compromise may need to be reached between the speed of the compressor and of the turbine, preventing one or both from operating at optimal speeds, which may compromise the aerodynamic efficiency of the auxiliary power unit.

Moreover, the compressor must typically be positioned in proximity of the component(s) to which they are mechanically connected, due to the geometric constraints of shafts, gearing, etc. This may limit the possible configurations for the auxiliary power unit, as well as the position of its main inlet, with which the compressor is fluidly connected.

SUMMARY

In one aspect, there is provided an auxiliary power unit for an aircraft, comprising: an engine configured as a rotary intermittent internal combustion engine; a turbine having an inlet in fluid communication with an outlet of the engine, the turbine compounded with the engine; a compressor having an inlet in fluid communication with an environment of the aircraft and an outlet in fluid communication with a bleed duct for providing bleed air to the aircraft, the compressor rotatable independently of the turbine; an electric motor drivingly engaged to the compressor; and a transfer generator drivingly engaged to the engine, the transfer generator and the electric motor being electrically connected to allow power transfer therebetween.

In another aspect, there is provided an auxiliary power unit for an aircraft, comprising: a plenum in fluid communication with an environment of the aircraft through a main inlet; an engine configured as a rotary intermittent internal combustion engine; a turbine having an inlet in fluid communication with an outlet of the engine, the turbine compounded with the engine; a first compressor having an inlet in fluid communication with the plenum and an outlet in fluid communication with an inlet of the engine; a second compressor having an inlet in fluid communication with the plenum and an outlet in fluid communication with a bleed duct for providing bleed air to the aircraft; an electric motor drivingly engaged to one of the first and second compressors, the one of the first and second compressors rotatable independently of the turbine; and a transfer generator drivingly engaged to the engine, the transfer generator and the electric motor being electrically connected to allow power transfer therebetween.

In a further aspect, there is provided a method of operating an auxiliary power unit of an aircraft, the method comprising: electrically driving a compressor to provide compressed air to the aircraft; generating electrical power with a rotary intermittent internal combustion engine; driving a turbine with an exhaust of the rotary intermittent internal combustion engine; generating electrical power with the turbine; and transferring electrical power between the compressor and the rotary intermittent internal combustion engine.

DESCRIPTION OF THE DRAWINGS

Reference is now made to the accompanying figures in which:

FIG. 1a is a schematic view of an auxiliary power unit in accordance with a particular embodiment;

FIG. 1b is a schematic view of an auxiliary power unit in accordance with another particular embodiment;

FIG. 1c is a schematic view of an auxiliary power unit in accordance with another particular embodiment;

FIG. 3 is a schematic view of an auxiliary power unit in accordance with another particular embodiment;

FIG. 4 is a schematic view of an auxiliary power unit in accordance with another particular embodiment; and FIG. 5 is a schematic view of an auxiliary power unit in accordance with another particular embodiment.

DETAILED DESCRIPTION

Figure 2:
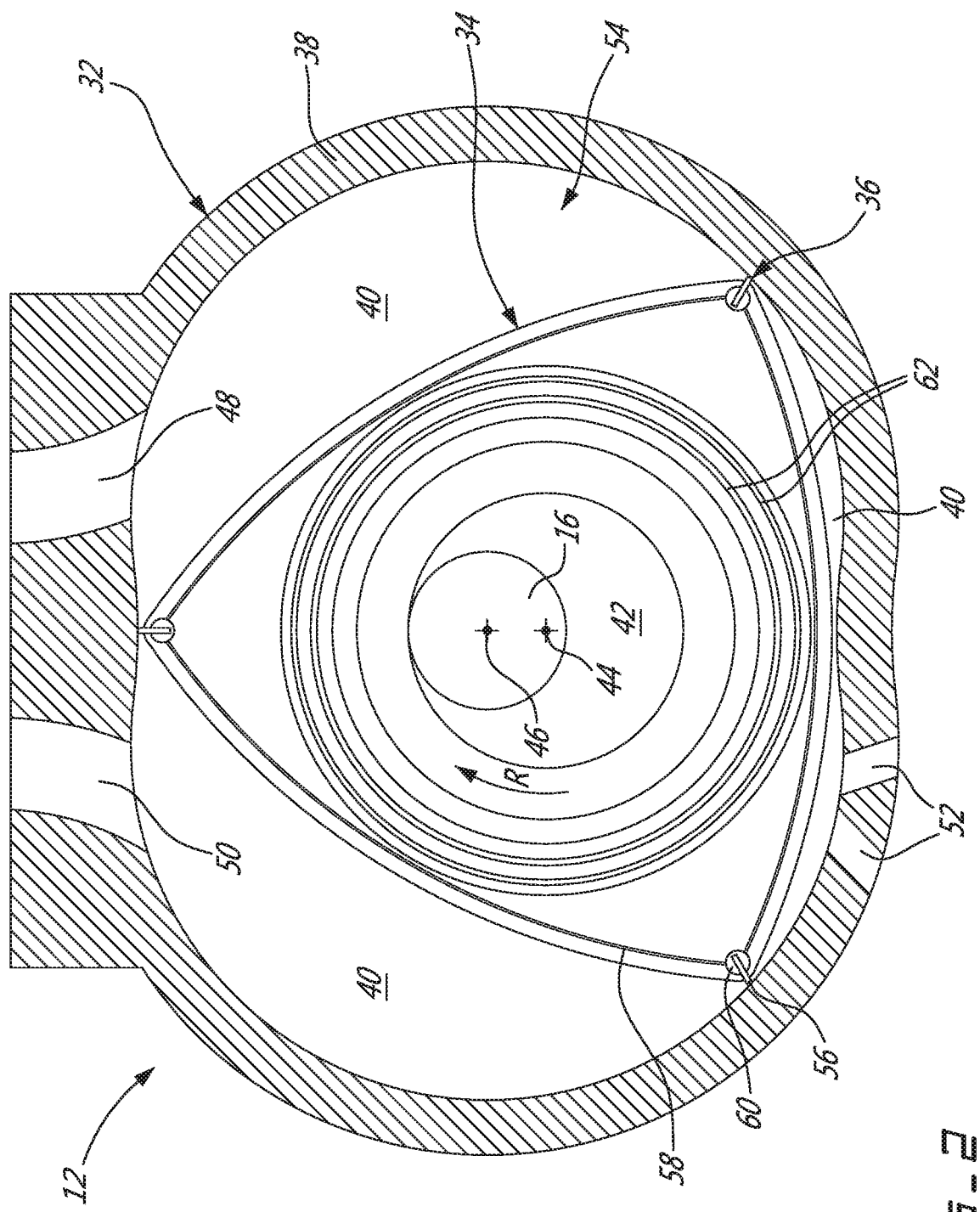
FIG. 2 is a schematic cross-sectional view of a rotary engine which can be used on the engine assembly of FIGS. 1a-1c.

Referring to FIG. 1a, an electric hybrid compound engine assembly 10 used as an auxiliary power unit (APU) for airborne APU applications is generally shown. In a particular embodiment, the assembly 10 may be installed and removed as a single assembly like a conventional APU, with the exception of a battery 8 thereof which may require a controlled temperature environment. The battery 8 may be provided in a separate battery compartment similar to that included in conventional APU installations, where the battery is typically used to power up the APU electronic control and provide power for the starter. Alternately, the auxiliary power unit 10 may be used as a fixed or mobile ground power unit.

The auxiliary power unit 10 includes an engine core 12' including one or more intermittent internal combustion engines 12 engaged to a common shaft 16. In a particular embodiment, the intermittent internal combustion engine(s) 12 is/are rotary internal combustion engine(s), for example Wankel engine(s); it is however understood that other types of internal combustion engines may alternately be used. Referring to FIG. 2, an example of a Wankel engine which may be used in the engine core 12' is shown. It is understood that the configuration of the engine(s) 12, e.g. placement of ports, number and placement of seals, etc., may vary from that of the embodiment shown.

The engine 12 comprises a housing 32 defining a rotor cavity having a profile defining two lobes, which is preferably an epitrochoid. A rotor 34 is received within the rotor cavity. The rotor defines three circumferentially-spaced apex portions 36, and a generally triangular profile with outwardly arched sides. The apex portions 36 are in sealing engagement with the inner surface of a peripheral wall 38 of the housing 32 to form and separate three working chambers 40 of variable volume between the rotor 34 and the housing 32. The peripheral wall 38 extends between two axially spaced apart end walls 54 to enclose the rotor cavity.

The rotor 34 is engaged to an eccentric portion 42 of an output shaft 16 to perform orbital revolutions within the rotor cavity. The output shaft 16 performs three rotations for each orbital revolution of the rotor 34. The geometrical axis 44 of the rotor 34 is offset from and parallel to the axis 46 of the housing 32. During each orbital revolution, each chamber 40 varies in volume and moves around the rotor cavity to undergo the four phases of intake, compression, expansion and exhaust.

An intake port 48 is provided through the peripheral wall 38 for admitting compressed air into one of the working chambers 40. An exhaust port 50 is also provided through the peripheral wall 38 for discharge of the exhaust gases from the working chambers 40. Passages 52 for a spark plug, glow plug or other ignition mechanism, as well as for one or more fuel injectors of a fuel injection system (not shown) are also provided through the peripheral wall 38. Alternately, the intake port 48, the exhaust port 50 and/or the passages 52 may be provided through the end or side wall 54 of the housing. A subchamber (not shown) may be provided in communication with the chambers 40, for pilot or pre injection of fuel for combustion.

For efficient operation the working chambers 40 are sealed by spring-loaded peripheral or apex seals 56 extending from the rotor 34 to engage the inner surface of the peripheral wall 38, and spring-loaded face or gas seals 58 and end or corner seals 60 extending from the rotor 34 to engage the inner surface of the end walls 54. The rotor 34 also includes at least one spring-loaded oil seal ring 62 biased against the inner surface of the end wall 54 around the bearing for the rotor 34 on the shaft eccentric portion 42.

The fuel injector(s) of the engine 12, which in a particular embodiment are common rail fuel injectors, communicate with a source of heavy fuel (e.g. diesel, kerosene (jet fuel), equivalent biofuel), and deliver the heavy fuel into the engine 12 such that the combustion chamber is stratified with a rich fuel-air mixture near the ignition source and a leaner mixture elsewhere.

Referring back to FIG. 1a, the auxiliary power unit 10 generally includes a supercharger compressor 20 compressing the air to feed the engine core 12'. Air from the environment of the aircraft enters a plenum 19 from the main inlet 14 of the auxiliary power unit 10. This plenum 19 feeds the compressor 20 so that an inlet of the compressor 20 is in fluid communication with the environment of the aircraft. The compressor 20 optionally has variable inlet guide vanes 23 for flow control and/or a variable diffuser 25. In a particular embodiment, the variable diffuser 25 provides a low flow high pressure mode if the compressor 20 is used to provide air to the aircraft when the engine core 12' is shut down.

An electric motor 64 (e.g. high speed electric motor) is drivingly engaged to the compressor 20, for example by having a shaft of the motor 64 directly connected to a shaft of the compressor 20, which is in turn directly connected to the rotor(s) of the compressor 20. In a particular embodiment, the motor 64 is an alternating current constant speed drive; alternately, the motor 64 may be a variable speed drive. The type of motor is selected depending on the range of air flow and pressure output required by the particular application for the auxiliary power unit 10.

The outlet of the compressor 20 is in fluid communication with the inlet of the engine core 12', in a particular embodiment through a heat exchanger 66: the compressor 20 thus delivers air through the heat exchanger 66 defining an intercooler and to the inlet of the engine core 12', for example to the intake port 48 of each rotary engine 12. In a particular embodiment, the compressor 20 is located in proximity of the intercooler 66 for minimum ducting loss and weight. In the embodiment shown, the intercooler 66 is received in a cooling air duct 68 receiving air for example from a compartment of the auxiliary power unit 10, so that cooling air may circulate through the intercooler 66 in heat exchange relationship with the compressed air fed to the engine core 12'. Alternately, the intercooler 66 may be cooled through an intermediate fluid link to a main engine cooler 70 through which the used coolant from the engine core 12' is circulated. The cooled compressed air is delivered to the engine core 12', for example at a temperature of 250° F. or less for an engine core 12' including rotary engine(s) 12.

The supercharger compressor 20 may also provide bleed air for the aircraft; in that case, air for the aircraft system is bled off before the intercooler 66, for example through a bleed air duct 72 as shown. In a particular embodiment, a shut off valve (not shown) is provided upstream of the intercooler 66.

Alternately, for example when the flow-pressure requirements of the engine core 12' and the aircraft cannot be efficiently reconciled to a single compressor, an additional compressor 21 is provided to provide the bleed air to bleed air duct 72 for the aircraft, and the outlet of the compressor 20 communicates only with the inlet of the engine core 12' (i.e. the communication between the compressor 20 and the bleed air duct 72 is omitted). An excess air duct (now shown) connecting the bleed air duct 72 to the cooling air duct 68 through a valve may be provided to divert excess air to the cooling air duct when bleed air is not required by the aircraft, to prevent surge of the bleed compressor 21. The bleed compressor 21 may be driven by a separate motor 65 (as shown in dotted lines in FIG. 1a) or by the same motor 64 as the core compressor 20; alternately, one of the compressors 20, 21 can be mechanically coupled to the engine core 12' running at nominally constant speed and the other electrically driven (as shown in FIG. 1b), or one of the compressors 20, 21 can be coupled to the turbine section and the other electrically driven (as shown in FIG. 1c).

In a particular embodiment, the cooling system includes the main engine liquid cooler 70, the intercooler 66 and an oil cooler 71. These are mounted close to the engine core 12', for example in the cooling air duct 68 on a frame attached to the engine core 12'; the coolers 66, 70, 71 may be mounted in series or in parallel. A fan 74 is located in the cooling air duct 68 downstream of the coolers 66, 70, 71 to drive ("pull") airflow from the engine compartment through the cooling air duct 68 and the coolers 66, 70, 71 and into the tailpipe section. In ground operation there is a separate ventilation air inlet (not shown) to the compartment. In flight, when there is ram pressure, this air comes from a side port (not shown) from the main aircraft inlet 14. Other configurations are also possible. In the embodiment shown, the fan 74 is mechanically driven by the engine core 12', for example through a direct engagement with the shaft 16 of the engine core 12' such as to rotate at a same speed.

The engine core 12' is engaged to a transmission 28 which in turn supports engine driven accessories (such as fuel and oil pumps, not shown). Although not shown, the fan 74 may also be driven through the transmission 28. In a particular embodiment, an aircraft generator 76 is directly driven by the engine core 12', for example including rotary engine(s) 12 and with the engine shaft 16 rotating at 8000 rpm. Alternately, the aircraft generator 76 may be driven through step up gearing by the transmission 28, which may make the generator 76 more compact.

The transmission 28 is also engaged to a transfer motor/generator 78 (e.g. high speed motor/generator), the primary purpose of which is to effect power transfer between the engine core 12' and the rest of the assembly. The transfer motor/generator 78 may transfer power away from the engine core shaft 16 or temporarily to the engine core shaft 16 if needed. It can serve as a starter. Alternately, this power transfer functionality may be integrated with the aircraft generator 76. However, in a particular embodiment separate motor/generators 76, 78 allow for improved system segregation and failure tolerance.

The outlet of the engine core 12' (e.g. exhaust port 50 of each rotary engine 12) is in fluid communication with the inlet of a turbine section, so that the exhaust from the engine core 12' is fed to one or more turbines 26, 22. One or more of the turbines 26, 22 is/are configured to compound power with the engine core 12' (e.g. through electrical power transfer). In a particular embodiment, the turbines 26, 22 are located as close to the engine core 12' as possible to minimize hot ducting surface, pressure loss and weight. In a particular embodiment, the first stage turbine 26 has an outlet in fluid communication with an inlet of the second stage turbine 22, with the turbines 26, 22 having different reaction ratios from one another. The degree of reaction of a turbine can be determined using the temperature-based reaction ratio (equation 1) or the pressure-based reaction ratio (equation 2), which are typically close to one another in value for a same turbine, and which characterize the turbine with respect to "pure impulse" or "pure reaction" turbines:

$$\text{Reaction}(T) = \frac{(t_{S3} - t_{S5})}{(t_{S0} - t_{S5})} \quad (1)$$

$$\text{Reaction}(P) = \frac{(P_{S3} - P_{S5})}{(P_{S0} - P_{S5})} \quad (2)$$

where T is temperature and P is pressure, s refers to a static port, and the numbers refers to the location the temperature or pressure is measured: 0 for the inlet of the turbine vane (stator), 3 for the inlet of the turbine blade (rotor) and 5 for the exit of the turbine blade (rotor); and where a pure impulse turbine would have a ratio of 0 (0%) and a pure reaction turbine would have a ratio of 1 (100%).

In a particular embodiment, the first stage turbine 26 is configured to take benefit of the kinetic energy of the pulsating flow exiting the core engine(s) 12 while stabilizing the flow and the second stage turbine 22 is configured to extract energy from the remaining pressure in the flow. Accordingly, in a particular embodiment the first stage turbine 26 has a lower reaction ratio (i.e. lower value) than that of the second stage turbine 22. In a particular embodiment, the first stage turbine 26 has a reaction ratio of 0.25 or lower (temperature or pressure based), and the second stage turbine 22 a reaction ratio higher than 0.25 (temperature or pressure based). Other values are also possible.

One or more of the turbine stages 26, 22 powers a generator 80 (e.g. high speed generator). In the embodiment shown, both turbine stages 26, 22 are drivingly engaged to the generator 80, for example by having a shaft of the generator 80 directly connected to a shaft of the turbines 26, 22, which is in turn directly connected to the rotor(s) of the turbines 26, 22. Alternately, the generator 80 may be coupled to only one of the turbine stages 26, 22 while the other may be coupled to the engine core 12' via the transmission or independently to a compressor 20, 21. More than two turbine stages may also be provided.

Exhaust from the turbine stages 26, 22 is ducted to mix with the cooling system exhaust and out of the exhaust tailpipe 30.

In a particular embodiment, a power electronics module 82 is located close to the cooling air inlet 69. The power electronics module 82 provides an electrical connection between the transfer motor/generator 78, the compressor motor(s) 64, 65, the turbine generator 80 and the battery 8. In a particular embodiment, the power electronics module 82 contains an alternating current motor drive for the compressor motor(s) 64, 65, rectifier and regulator for the turbine generator 80, bi-directional drive/regulation for the transfer motor/generator 78 and charge current regulator for the battery 8; alternately, the charge current regulator may be located within the battery assembly. The power electronics module 82 accepts inputs from an APU electronic control 84, which in turn responds to the aircraft input and feedback from system sensors.

In a particular embodiment, the storage battery 8 has high energy density, and is for example a Li-Polymer multi cell 270 V direct current battery. In a particular embodiment, this battery 8 is capable of outputs up to 50 or 60 KW over very short periods, and an energy density around 0.75 KW/Kg. Other values are also possible.

FIG. 1b shows an electric hybrid compound engine assembly auxiliary power unit 110 in accordance with another embodiment, where elements similar to that of the embodiments of FIG. 1a are identified with the same reference numerals and will not be further described herein. In this embodiment the bleed compressor 121 is driven by an electric motor 165 while the core compressor 120 is mechanically coupled to the engine core 12', either directly or through the transmission 28.

FIG. 1c shows an electric hybrid compound engine assembly auxiliary power unit 110' in accordance with another embodiment, where elements similar to that of the embodiments of FIG. 1a are identified with the same reference numerals and will not be further described herein. In this embodiment the bleed compressor 121' is driven by an electric motor 165 while the core compressor 120' is mechanically coupled to the turbines 22, 26, for example by being coupled to the turbine generator 80 as shown.

FIG. 3 shows an electric hybrid compound engine assembly auxiliary power unit 210 in accordance with another embodiment, where elements similar to that of the embodiments of FIGS. 1a-1b are identified with the same reference numerals and will not be further described herein. Although not shown, an additional compressor 21 could be provided for aircraft bleed air, with the compressors 20, 21 configured for example as set forth in FIG. 1a, 1b or 1c.

In this embodiment, the cooling fan 274 is electrically powered by a fan motor 286, rather than by a mechanical drive connected to the engine core 12'. In this configuration the power electronics module 82 provides an additional output for the fan motor 286, so that the fan motor 286 is electrically connected to the transfer motor/generator 78, the compressor motor(s) 64, the turbine generator 80 and the battery. The complexity of this output may vary. It could be a simple direct current link with the motor control electronics on the fan motor 286, it could be an alternating current link or it could be bi-directional; in a particular embodiment, a bi-directional link allows for harvesting of power from the wind milling of the fan 274 when the door of the inlet 69 is open and the auxiliary power unit 210, 310, 410 is non-operating during flight.

This embodiment can provide some advantages in the sizing and operation of the fan 274: it may be turned off for example to save power until the coolant reaches a predetermined temperature. Its operating speed may be reduced on cold days when less cooling effort is required. Its design speed may be optimized for packaging volume.

FIG. 4 shows an electric hybrid compound engine assembly auxiliary power unit 310 in accordance with another embodiment, where elements similar to that of the embodiment of FIG. 3 are identified with the same reference numerals and will not be further described herein. Although not shown, an additional compressor 21 could be provided for aircraft bleed air, with the compressors 20, 21 configured for example as set forth in FIG. 1a, 1b or 1c. Although the fan 274 is shown as being driven by the fan motor 286, it could alternately be driven by the engine core 12', for example as set forth in FIG. 1a.

In this embodiment, the turbine generator and compressor motor are replaced by a common electrical machine 388 (e.g. high speed motor/generator). The turbines 26, 22 are mechanically linked to the compressor 20 by a turbo-machine shaft 324, and the motor/generator 388 is engaged to the turbo-machine shaft 324. The motor/generator 388 acts as a motor or a generator depending on whether it is required to add or subtract torque. In a particular embodiment, attaching the turbines 26, 22 to the compressor 20 mechanically reduces the power transfer requirements of the system in normal operation, which is a consideration since the motor/generator 388 and power electronics module 82 create heat in relation to the electric current being handled.

In a particular embodiment, the turbines 26, 22 are coupled to the turbo-machine shaft 324 by an over-running clutch 390 such that the compressor 20 can be accelerated to a higher speed than the free running speed of the turbines 26, 22; the compressor 20 may thus selectively be rotatable independently of the turbines 26, 22. In a particular embodiment, the clutch 390 allows for boosting the supercharge in transient conditions from low power of the engine core 12' (to reduce or eliminate turbo lag) and for motoring the compressor 20 without creating turbine drag when the engine core 12' is shut down. In a particular embodiment, the clutch 390 provides some protection to the turbines 26, 22 to reduce the risk of or prevent the turbines 26, 22 from exceeding the set speed of the motor/generator 388, by allowing the motor/generator 388 and the compressor 20 to act as a brake on the turbines 26, 22 through the over-running clutch 390.

Alternately, the over-running clutch 390 may be replaced by any type of clutch having positive engagement and disengagement configurations suitable for use at the rotational speeds of the compressor 20 and turbines 26, 22. In a particular embodiment steps are taken to limit (or structurally tolerate) the maximum speed that can be achieved by de-coupled turbines. In an alternate embodiment, the turbines 26, 22 and compressors 20 are connected through an intermediate gear system with the clutch (e.g. overrunning clutch) separating the electrical machine/compressor portion of the drive from the turbine portion of the drive; the clutch may be provided at a convenient intermediate gear stage having a speed compatible with the over-running clutch.

FIG. 5 shows an electric hybrid compound engine assembly auxiliary power unit 410 in accordance with another embodiment, where elements similar to that of the embodiment of FIG. 4 are identified with the same reference numerals and will not be further described herein. Although not shown, an additional compressor 21 could be provided for aircraft bleed air, with the compressors 20, 21 configured for example as set forth in FIG. 1a, 1b or 1c. Although the fan 274 is shown as being driven by the fan motor 286, it could alternately be driven by the engine core 12', for example as set forth in FIG. 1a.

In this embodiment, the turbines 22, 426 are spilt. The first stage (e.g. lower reaction ratio) turbine 426 is more efficient at an intermediate speed and is compounded to the engine core 12' by being mechanically engaged therewith, for example through the transmission 28. The second stage (e.g. higher reaction ratio) turbine 22 is coupled to the compressor 20 through a free turbo-machine shaft 424 in a similar manner to a turbocharger. The motor/generator 388 on the turbo-machine shaft 424 allows for transferring power to the compressor 20 or extracting more load from the second stage turbine 22. The second stage turbine 22 is optionally connected to the turbo-machine shaft 424 through a clutch 490 (as shown) so as to allow for motoring of the compressor 20 without creating turbine drag when the engine core 12' is shut down.

In use and in a particular embodiment, the auxiliary power unit 10, 110, 110', 210, 310, 410 is operated by electrically driving the compressor 20, 21 to provide compressed air to the aircraft, generating electrical power with the engine core 12', driving the turbines 22, 26, 426 with an exhaust of the engine core, generating electrical power with the turbine(s) 22, 26, and transferring electrical power between the compressor 20, 21 and the engine core 12'. The method may further include electrically driving the separate core compressor 20 to provide compressed air to the engine core 12', and transferring electrical power between the compressors 20, 21 and the engine core 12'.

In a particular embodiment, the use of electrical machines 64, 65, 78, 80, 165, 388 on the turbines 22, 26, compressor(s) 20, 21 and engine core 12' and management of the energy transfer between the electrical machines 64, 65, 78, 80, 165, 388 allows for the system to adapt to changes in operating conditions. The storage of energy in the battery 8 advantageously provides for the energy from the battery 8 to be used for peak load topping (for example to support main engine start (MES) or maximum demand on the aircraft environmental control system (ECS), which represent the highest loads of an auxiliary power unit running on the ground). Similarly the battery 8 can be used when the auxiliary power unit 10, 110, 110', 210, 310, 410 is used in flight, for example at the top of descent at very high altitude (e.g. above 35,000 feet) which demands high load at low atmospheric pressure for a short period of time. Consequently the loads can be averaged and the size of the engine core 12' can be optimized for an average duty cycle load including battery recharge, which may allow for the engine core 12' to be smaller and operated for a larger percentage of the duty cycle at optimal efficiency conditions. This may allow a reduction of average fuel consumption, emission and/or noise levels by having the engine core 12' operate at preferred conditions for a greater portion of the cycle.

In a particular embodiment, load transients may be improved by managing the electric power transfer system between the engine core 12' and the compressor 20.

In a particular embodiment, the electrically driven compressor(s) 20, 21 and electrically compounded turbine(s) 22, 26 can be run at optimal speeds and therefore be smaller and/or more aerodynamically efficient than compressor(s)

and turbine(s) mechanically coupled to the rotary core, where a compromise may be necessary.

In a particular embodiment, power can be transferred between the engine core 12' and the compressor 20, 21 to optimize the operating point of each. With variable speed operation of the compressor 20, 21 a wide range of flow and pressure may be obtained efficiently without recourse to inefficient highly closed inlet guide vane settings for lower flow and pressure ratio conditions.

In a particular embodiment and as discussed above, the compressor 20, 21 can be individually driven electrically without requiring start-up of the engine core 12'. Accordingly, it may be possible to offer a short term pneumatic power capability to the aircraft (e.g. perform pneumatic main engine starting and/or provide some cabin conditioning for a short period) using the compressor 20, 21 driven only on battery power, i.e. without starting the auxiliary power unit 10, 110, 110', 210, 310, 410. This may be advantageous for redundancy (e.g. for main engine start) and in situations where minimum noise and emissions are critical (e.g. near the gate area).

In particular embodiments where the compressor 20, 21 is driven by a dedicated electrical motor 64, 65, 165, the compressor 20, 21 and inlet 14 can be positioned as convenient for the benefit of the overall installation package, without worrying about geometric constraints of shafts and gearing to the engine core shaft 16. Shaft lengths can be limited (for example) by dynamic concerns and gear center distances may be limited by pitch line speeds; angles of elements like bevel drives may also be constrained. By contrast, transmitting the load electrically is done by wires which may be routed conveniently as required, providing more flexibility in positioning of the driven elements.

In particular embodiments, the electrically driven cooling fan 274 allows the cooling fan 274 to be used as a ram air turbine in flight if the APU inlet door is opened while the auxiliary power unit 210, 310, 410 is not operating. Electricity generated by the electrical machine 286 engaged to the fan 274 and/or the power of the battery 8 can be used in emergencies to eliminate the need for a separate ram air turbine used for last chance emergency power on many larger commercial aircraft; the electricity generated by the fan 274 may be used to supplant starter power in flight and/or achieve windmill starting of the engine core 12' without battery assist. Additionally the APU battery 8 may be used as a significant source of aircraft emergency electrical power. In the event improved segregation is required for the emergency wind-milling function, a second set of windings may be included in the fan motor 286, dedicated to the emergency power function.

In a particular embodiment, the fan 74 mechanically driven by the engine core 12' as per FIGS. 1a-1b may also allow for windmill starting.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method of operating an auxiliary power unit of an aircraft, the method comprising:
   electrically driving a compressor to provide compressed air to the aircraft;
   generating electrical power with a rotary intermittent internal combustion engine;
   driving a turbine with an exhaust of the rotary intermittent internal combustion engine;
   generating electrical power with the turbine; and
   transferring electrical power between the compressor and the rotary intermittent internal combustion engine.

2. The method as defined in claim 1, wherein the compressor is a first compressor, the method further comprising:
   electrically driving a second compressor to provide compressed air to an inlet of the rotary intermittent internal combustion engine; and
   transferring electrical power between the first compressor, the second compressor and the rotary intermittent internal combustion engine.

3. The method as defined in claim 1, further comprising electrically driving a cooling fan with the electrical power generated with the rotary intermittent internal combustion engine or with the electrical power generated with the turbine, the cooling fan in fluid communication with coolers providing heat exchange relationship between a liquid coolant of the rotary intermittent internal combustion engine and ambient air.

4. The method as defined in claim 1, further comprising transferring the electrical power generated with both of the rotary intermittent internal combustion engine and with the turbine to a power electronic module.

5. The method as defined in claim 4, further comprising selectively transferring the electrical power from the power electronic module to a first electric motor in driving engagement with the compressor, to a second electric motor in driving engagement with a cooling fan, to a battery, and/or to an accessory.

6. The method as defined in claim 1, wherein electrically driving the compressor includes driving an electric motor directly drivingly engaged to a shaft of the compressor.

7. The method as defined in claim 2, wherein electrically driving the second compressor includes driving the compressor and the second compressor with a common electric motor in driving engagement with shafts of the compressor and the second compressor.

8. The method as defined in claim 2, wherein electrically driving the second compressor includes driving each of the compressor and the second compressor with a respective one of two electric motors.

9. The method as defined in claim 1, further comprising feeding compressed air to the rotary intermittent internal combustion engine.

10. The method as defined in claim 1, wherein the turbine is a first stage turbine, the method further comprising driving a second stage turbine having an inlet in fluid communication with an outlet of the first stage turbine.

11. The method as defined in claim 10, wherein generating electrical power with the turbine includes driving a generator with the second stage turbine.

12. The method as defined in claim 11, wherein driving the turbine with the exhaust of the rotary intermittent internal combustion engine includes driving a shaft of the engine with the first stage turbine.

13. The method as defined in claim 1, wherein generating the electrical power with the turbine includes driving a generator with the turbine through a clutch.

14. The method as defined in claim 2, further comprising transferring heat from the compressed air exiting the second compressor to a flow of cooling air before feeding the compressed air to the rotary intermittent internal combustion engine.

15. The method as defined in claim 14, further comprising generating the flow of cooling air by driving a cooling fan.

16. The method as defined in claim 15, wherein driving the cooling fan includes driving the cooling fan with an electric motor.

* * * * *